Figure 1:
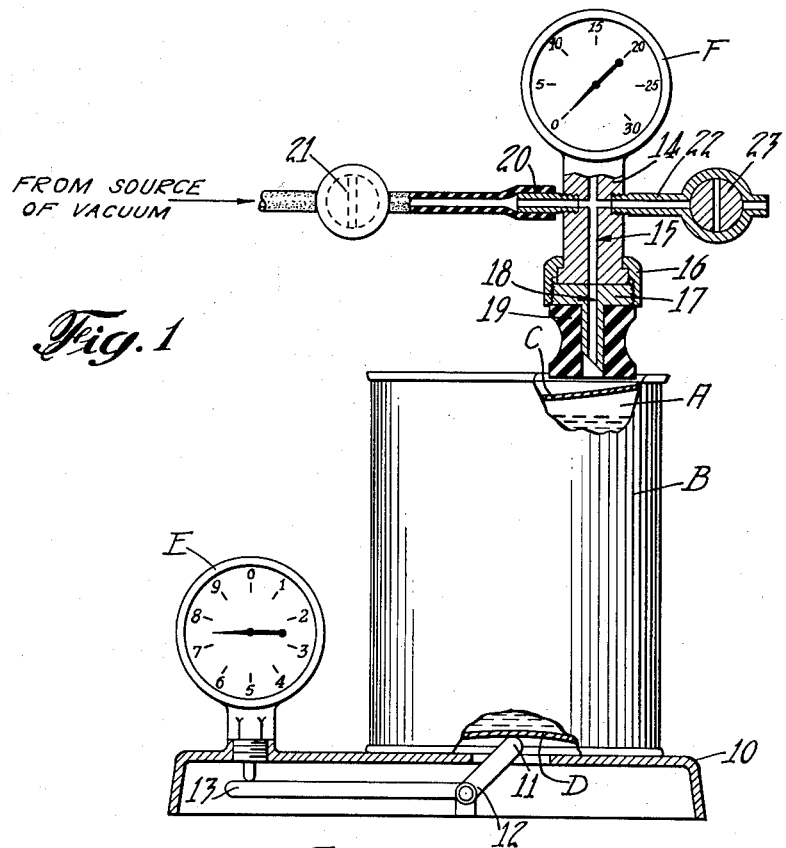

March 13, 1956

J. J. DOUDERA, JR., ET AL 2,737,803

METHOD OF AND APPARATUS FOR PRESSURE
TESTING FILLED CONTAINERS

Filed Feb. 8, 1952

2 Sheets-Sheet 1

INVENTORS
JOHN J. DOUDERA JR.
EDWARD L. BLAKSLEE
BY Charles H. Erne
Leland R. McCann
George W. Reiber
ATTORNEYS

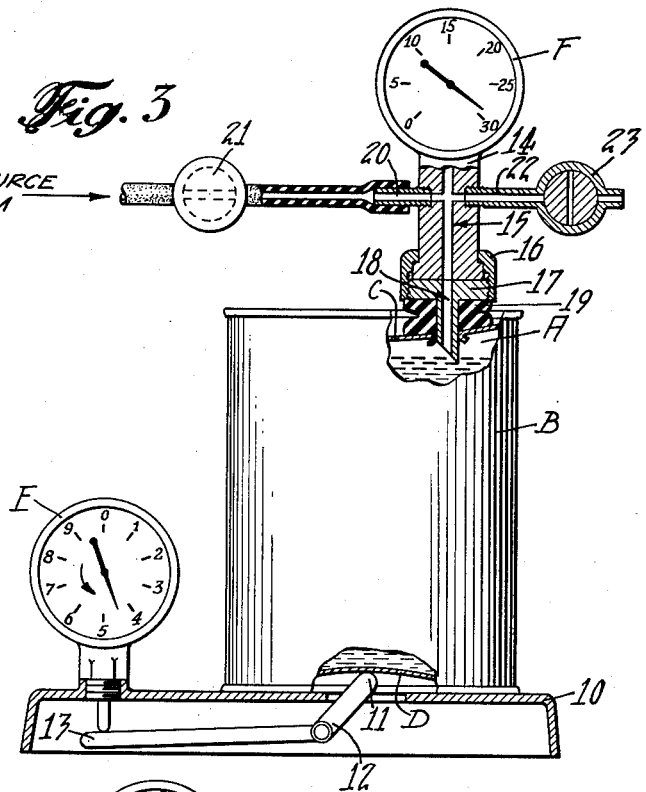
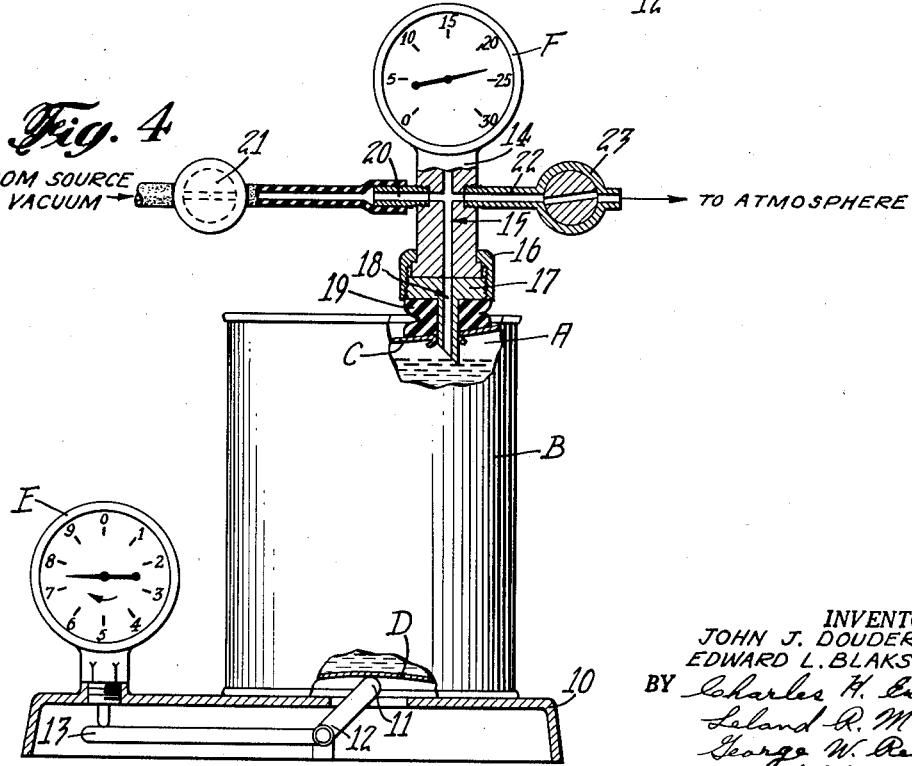

United States Patent Office 2,737,803
Patented Mar. 13, 1956

2,737,803

METHOD OF AND APPARATUS FOR PRESSURE TESTING FILLED CONTAINERS

John J. Doudera, Jr., Union, N. J., and Edward L. Blakslee, Lombard, Ill., assignors to American Can Company, New York, N. Y., a corporation of New Jersey Application February 8, 1952, Serial No. 270,642

12 Claims. (Cl. 73—37)

The present invention relates to an improved method of and apparatus for testing sealed containers or cans for internal pressure and has particular reference to such a method and apparatus which compensates for atmospheric air trapped in instruments used for such tests.

In the packaging of products in metallic containers or cans, it is sometimes desirable to can or pack under pressures above or below normal atmospheric pressures and to retain this pressure in the headspace of the filled and sealed cans. In order to be certain that the desired pressure condition obtains in the sealed cans, inspection of arbitrarily selected cans is usually resorted to. These cans are punctured and a pressure or vacuum gauge, as the case may be, is applied to the punctured can to determine the internal pressure.

The above method of testing cans for internal pressure does not take into consideration the atmospheric air trapped within the testing device or gauge. Hence in some cases where the volume of the headspace of the can is small and the volume of the interior cavities of the testing device relatively large, inaccurate determinations are sometimes obtained, since the large volume of air in the gauge seriously affects the accurate determination of the headspace pressure in the can.

An object of the instant invention is the provision of a method of and apparatus for accurately determining the internal pressure of sealed cans to overcome the above mentioned difficulties wherein atmospheric air trapped within instruments used in the test is compensated for so that a true determination of the sealed-in pressure condition of a can may be readily obtained.

Numerous other objects and advantages of the invention will be apparent as it is better understood from the following description, which, taken in connection with the accompanying drawings, discloses a preferred embodiment thereof.

Figure 2:
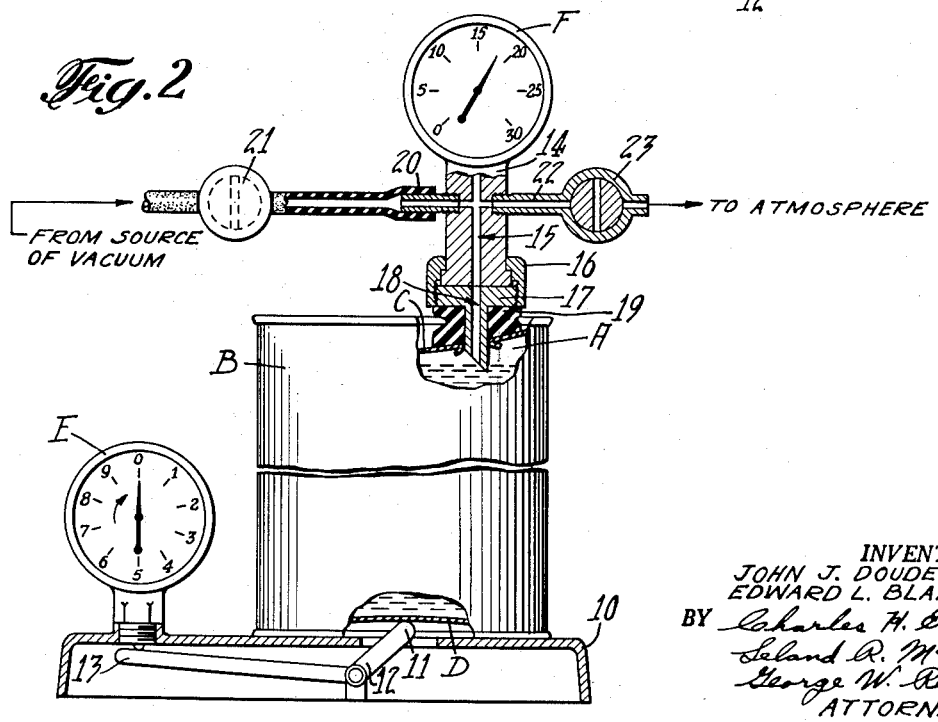

Referring to the drawings:

Figure 1 is an elevational view of a can to be tested and a testing device of the instant invention disposed in spaced relation thereto for testing the can in accordance with the method steps of the instant invention, parts of the can and the device being broken away and shown in section; and Figs. 2, 3 and 4 are views similar to Fig. 1, showing the testing device applied to the can, the various views illustrating different positions of the movable parts of the device and the can at different steps during the testing of the can.

As a preferred or exemplary embodiment of the instant invention the drawings disclose a method of and apparatus for determining the internal pressure of a vacuumized headspace A of a filled and sealed sheet metal can B having top and bottom imperforate sheet metal closure members C, D respectively. The sheet metal closure members C, D usually applied to cans are inherently flexible enough to react in the form of deflections to variations in headspace internal pressures and this fact is utilized in the instant method of testing the cans.

In accordance with the instant method invention the first step in determining the internal pressure of a sealed can to be tested is to measure or observe the degree of deflection or position of the bottom closure member of the can by reference to some stable part of the can, for example the bottom end seam which is substantially rigid and inflexible. This deflection or position, hereinafter referred to as the original deflection, is made note of for subsequent reference.

After recording the original deflection of the can bottom, the internal pressure of the can is altered in such a manner that the altered pressure is measurable. For this purpose the top of the can is preferably punctured to form an opening for access to the headspace A. Where a nozzle or other dispensing device is provided, access to the headspace may be gained through the dispensing opening of the can by removing its closure. The opening, whether of the above mentioned punctured or preformed dispensing types, is not opened to provide access to the can headspace until after the original deflection of the can bottom or other flexible wall is recorded. A vacuum is then drawn on the interior of the can through the opening to exhaust substantially all of the air therefrom including any atmospheric air which was introduced into the can when it was opened by puncturing or otherwise. This altering of the internal pressure of the can, affects the can bottom D and causes it to deflect inwardly. This deflection however need not be recorded since the amount of the deflection is of minor importance. Only the fact that some deflection takes place is of importance.

Following this step the vacuumized condition of the interior of the can is again altered by a controlled introduction of air under atmospheric or other pressure into the can and a simultaneous accurate measurement of the amount of introduced air i. e. pressure within the can. Introduction of this air or pressure into the can affects the can bottom and causes it to flex in a direction opposite to its deflection during the vacuumizing step. This introduction of air is effected very slowly while the deflection of the can bottom is constantly and carefully observed and measured. When the flexed can bottom reaches its original deflection, the then existent pressure in the can is measured and noted. It is this pressure that was originally in the can and the pressure recreated in the can is thus the measurement of the original pressure.

It should be noted that in altering the pressure within the can, the atmospheric air may be introduced into the can first and this step followed by a controlled slow vacuumizing of the can to recreate the original pressure. It is immaterial which step is effected first since both procedures give the same result. However the first described method is preferred. The same result may be obtained by a slow vacuumization of the can headspace. This method eliminates the step of introducing air into the highly vacuumized headspace as shown in Fig. 4.

One form of device for carrying out the method steps of the instant invention includes a platform or base 10 (Fig. 1) on which a can B is placed for testing. Detection of the original deflection of the can bottom D is effected by a short arm 11 which extends up through an opening in the platform and engages against the can bottom. The arm 11 is part of a bell crank 12 which is pivotally mounted in the base 10 and which is formed with a long arm 13 the outer end of which engages against a movable element of a conventional dial deflection gauge or indicator E equipped with a rotatable needle and graduations to indicate the degree of deflection of the can bottom. As an example the indicator E in Fig. 1 shows that for the original deflection or position of the can bottom D, the needle of the indicator stands at 7.5. This indicator reading is noted as the reading to which the needle must be subsequently returned at the completion of the test to indicate when the can bottom has returned to its original position as outlined above.

Measurement of the internal pressures of the can is effected by a conventional pressure or vacuum gauge F (Fig. 1) having a graduated dial and rotatable indicator needle. The gauge F is mounted on a tubular body 14 having an open passageway 15. The lower end of the body 14 is connected by a collar 16 to a sharp pointed piercing or puncturing stem 17 provided with an open bore 18 communicating with the passageway 15.

The piercing stem 17 is surrounded by a cylindrical resilient sealing collar 19 preferably made of rubber or the like material, which projects beyond the sharp point of the stem. The purpose of this resilient collar is to surround and seal off the hole made in the can top when it is punctured to exclude uncontrolled atmospheric air from the can during the test.

Figure 2 illustrates the vacuum gauge applied to the can with the top of the can punctured by the gauge stem 17. The drawing illustrates that air trapped in the cavities of the gauge and its passageways and bores has been introduced into the can headspace and has altered the vacuum therein sufficient to cause the can bottom D to flex outwardly slightly and thus change the reading of the dial indicator from 7.5 to 0, the needle rotating in the direction indicated by the arrow on the dial. The vacuum gauge F shows this altered vacuum within the can as being approximately 18 inches of vacuum.

For the purpose of vacuumizing the can B as outlined above, the body 14 of the vacuum gauge F is connected by a conduit or tube 20 which leads from any suitable source of high vacuum for exhausting the air from the can. This tube communicates with the passageway 15 in the gauge body 14. A manually operable, normally closed valve 21 is interposed in the vacuum line (tube 20) to control the vacuumizing operation. After puncturing the can, the valve 21 is opened as shown in Fig. 3 and the air exhausted from the can interior. This action causes the can bottom D to flex inwardly and thus change the reading of the dial indicator from the 0 reading to a new reading for example the reading 4.5 shown in Fig. 3, the needle rotating in the direction of the arrow shown on the dial. The vacuum gauge F at this stage of the method shows the then existing pressure condition of the can interior, the gauge showing for example approximately 29 inches of vacuum.

The controlled introduction of air into the can to recreate the original pressure therein as outlined above is effected by a venting conduit or air line 22 communicating with the passageway 15 in the gauge body 14 and leading from the outside atmosphere. This air line may lead from any suitable source of air under pressure if desired. A manually operable normally closed valve 23 is interposed in the line to control the entrance of air into the passageway 15 and the can headspace A.

After the can headspace A is vacuumized and while the vacuum valve 21 remains open, the air valve 23 is opened just sufficiently as shown in Fig. 4 to admit air very slowly into the can. As this air enters the can the pressure therein builds up gradually and thus gradually flexes the can bottom outwardly toward its original position or deflection. This causes the vacuum gauge to show decreasing degrees of vacuum and also causes the indicator needle on the dial indicator E to rotate slowly in the direction of the arrow in Fig. 4 toward its original noted setting of 7.5. During the pressure buildup in the can the indicator E is closely watched and when its needle coincides with the original 7.5 setting, the pressure indicated on the vacuum gauge F is noted, as for example the reading of 23 inches of vacuum shown in Fig. 4. This concludes the test, the pressure of for example 23 inches of vacuum thus recreated in the can and indicated on the vacuum gauge showing the original pressure in the can.

It is thought that the invention and many of its attendant advantages will be understood from the foregoing description, and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

We claim:

1. A method of determining the internal pressure of sealed containers having flexible wall sections capable of movement under changes in internal pressure, which comprises recording the original position of a flexible wall section, piercing said container while excluding outside atmosphere from the interior of said container, altering the pressure within the container to effect a deflection of said flexible wall section in one direction, re-altering the pressure within the container an amount sufficient to cause said flexible wall section to flex past its original position, again re-altering the pressure within the container to effect a return deflection of said flexible wall section to its original position, and recording the pressure in the container when the flexible wall section reaches its original recorded position.

2. A method of determining the internal pressure of sealed containers having flexible wall sections capable of movement under changes in internal pressure, which comprises recording the original position of a flexible wall section, piercing said container while excluding the outside atmosphere from the interior of said container, pulling a vacuum on the interior of said container greater than the original container vacuum to effect a deflection of said flexible wall section, introducing air into said container to effect a return deflection of said flexible wall section to its original position, and recording the pressure in the container when the flexible wall section reaches its original recorded position.

3. A method of determining the internal pressure of sealed pressure packed containers having flexible wall sections capable of deflection under changes in internal pressure, which comprises recording the original position of a flexible wall section, piercing said container while excluding outside atmosphere from said container, altering the pressure within the container to thereby effect a deflection of said flexible wall section, pressurizing said container an amount sufficient to cause said flexible wall section to flex past its original position, introducing air under atmospheric pressure into said container to effect a return deflection of said flexible wall section to its original position, and recording the pressure in the container when the flexible wall section reaches its original recorded position.

4. A method of determining the internal pressure of sealed containers having flexible wall sections capable of movement under changes in internal pressure, which comprises recording the original position of a flexible wall section, penetrating the container while preserving its hermetic seal to establish pressure communication between the interior thereof and a gaseous medium, to thereby alter the pressure within the container toward atmospheric pressure and thus effect a deflection of said flexible wall section from said original position, re-altering the pressure within the container to effect deflection of said flexible wall section back to its original position, and recording the pressure in the container when the flexible wall section reaches its original recorded position.

5. A method of determining the original internal pressure of sealed containers having flexible wall sections capable of movement under changes in internal pressure, which comprises recording the original position of a flexible wall section, opening said container to establish atmospheric pressure therein to thereby effect a deflection in said flexible wall section, hermetically resealing the container and slowly recreating the original pressure in the container, said original pressure being determined when said flexible wall reaches its said original recorded position.

6. An apparatus for determining the internal pressure of a sealed container having a flexible wall section capable of movement under changes in internal pressure, said apparatus comprising a deflection gauge in engagement with said flexible wall of the container for indicating the original and subsequent positions of said wall section, a pressure gauge having a stem thereon, a sharp point formed at one end of said stem for penetrating a wall of the container, said stem having a channel therein extending from said point to said pressure gauge for establishing communication between said pressure gauge and the interior of the penetrated container, sealing means around said stem adjacent said point for hermetically sealing said penetrated wall, pressure producing means, a conduit in said stem establishing communication between said pressure producing means and said pressure gauge and said penetrated container through said channel in the stem, and a valve between said pressure producing means and said stem point for effecting a pressure differential between said container and said pressure producing means for restoring said deflected flexible wall of the container to its original position initially shown on said deflection gauge to determine the original pressure in said container which is shown simultaneously on said pressure gauge.

7. An apparatus for determining the internal pressure of a vacuum sealed container having a flexible wall section capable of movement under changes in internal pressure, said apparatus comprising a deflection gauge in engagement with said flexible wall of the container for indicating the original and subsequent positions of said wall section, a vacuum gauge having a stem thereon, a sharp point formed at one end of said stem for penetrating a wall of the container, said stem having a channel therein extending from said point to said vacuum gauge for establishing communication between said pressure gauge and the interior of the penetrated container, sealing means around said stem adjacent said point for hermetically sealing said penetrated wall, vacuum producing means, a vacuum conduit in said stem establishing communication between said vacuum producing means and said pressure gauge and said penetrated container through said channel in the stem, a vacuum valve between said vacuum producing means and said stem point for controlling communication between said vacuum producing means and the interior of said container, a venting conduit communicating with said stem channel, and a venting valve in said venting conduit for controlling the venting of the container, said deflected flexible wall of the container being restored to its original position as indicated on said deflection gauge by operating said vacuum and venting valves and the original vacuum in said container being shown simultaneously on said pressure gauge.

8. An apparatus for determining the internal pressure of a sealed container having a flexible wall section capable of movement under changes in internal pressure, said apparatus comprising a deflection gauge in engagement with said flexible wall of the container for indicating the original and subsequent positions of said wall section, a pressure gauge having a stem thereon, a sharp point formed at one end of said stem for penetrating a wall of the container, said stem having a channel therein extending from said point to said pressure gauge for establishing communication between said pressure gauge and the interior of the penetrated container, sealing means around said stem adjacent said point for hermetically sealing said penetrated wall, means for producing pressures above atmospheric pressure, a pressure conduit in said stem establishing communication between said pressure means and said pressure gauge and said penetrated container through said channel in the stem, a pressure valve between said pressure means and said stem point for controlling communication between said pressure means and the interior of said container, a venting conduit communicating with said stem channel, and a venting valve in said venting conduit for controlling the venting of the container to the atmosphere, said deflected flexible wall of the container being restored to its original position as indicated on said deflection gauge by operating said pressure and venting valves, and the original pressure in said container being shown simultaneously on said pressure gauge.

9. A method of determining the original internal pressure of sealed containers having flexible wall sections capable of movement under changes of internal pressure, which comprises maintaining the exterior of said container under a constant external pressure and recording the original position of a flexible wall section, opening said container and bringing its interior into communication with a gaseous medium at a pressure differing from said original internal pressure in order to alter the pressure within the container and thereby effect a deflection of said flexible wall section from said original position, re-altering the pressure within the container while maintaining the exterior of said container under said external pressure and sealing the interior of said container therefrom to effect a return deflection of said flexible wall section to its original position, and recording the pressure in the container when said flexible wall section reaches its original recorded position, said recorded pressure being identical to the original pressure of said container.

10. A method of determining the original internal pressure of sealed containers having flexible wall sections capable of movement under changes of internal pressure, which comprises maintaining the exterior of said container under a constant external pressure and recording the original position of a flexible wall section, opening said container with the opening thereof in communication with a fluid atmosphere under about the pressure expected to exist in the container, recording any change in said original position of the flexible wall section, altering the pressure of said fluid atmosphere while maintaining the exterior of said container under said external pressure and sealing the interior of said container therefrom to restore said flexible wall to said original position, and recording said altered pressure when the flexible wall section reaches said original position, said recorded pressure being equal to said original internal pressure in the container.

11. An apparatus for determining the internal pressure of a sealed container having a flexible wall section capable of movement under changes in internal pressure, said apparatus comprising a deflection gauge in engagement with said flexible wall of the container for indicating the original and subsequent positions of said wall section, a body member, a pressure gauge mounted on said body member, said body member having a channel therein for establishing communication between said pressure gauge and the interior of the container through an opening in the container opened after said original position of said flexible wall section has been indicated by said deflection gauge, sealing means mounted on said body member for forming a hermetic seal between said body and said container around said opening, pressure producing means, a conduit in said body member establishing communication between said pressure producing means and said pressure gauge and said opened container through said channel in the body member, and a valve between said pressure producing means and said opened container for effecting a pressure differential between said container and said pressure producing means for restoring said deflected flexible wall of the container to its original position initially shown on said deflection gauge to determine the original pressure in said container which is shown simultaneously on said pressure gauge.

12. An apparatus for determining the internal pressure of a sealed container having a flexible wall section capable of movement under changes in internal pressure, said apparatus comprising a deflection gauge in engagement with said flexible wall of the container for indicating the original and subsequent positions of said wall section, a body member, a pressure gauge mounted on said body member, piercing means carried by said body member for creating an opening in said container after said original position of said flexible wall section has been indicated by said deflection gauge, said body member having a channel therein for establishing communication between said pressure gauge and the interior of said container through said opening, sealing means mounted on said body member for forming a hermetic seal between said body member and container around said opening, pressure producing means, a conduit in said body member establishing communication between said pressure producing means and said pressure gauge and said opened container through said channel in the body member, and a valve between said pressure producing means and said opened container for effecting a pressure differential between said container and said pressure producing means for restoring said deflected flexible wall of the container to its original position initially shown on said deflection gauge to determine the original pressure in said container which is shown simultaneously on said pressure gauge.

References Cited in the file of this patent

UNITED STATES PATENTS

| | | |
|---|---|---|
| 1,344,515 | Phelps | June 22, 1920 |
| 2,393,552 | Morpeth | Jan. 22, 1946 |
| 2,512,134 | Baule | June 20, 1950 |
| 2,695,515 | Ward et al. | Nov. 30, 1954 |